Jan. 3, 1933.  H. F. SCHMIDT  1,893,040
LUBRICATING SYSTEM
Filed Feb. 3, 1932
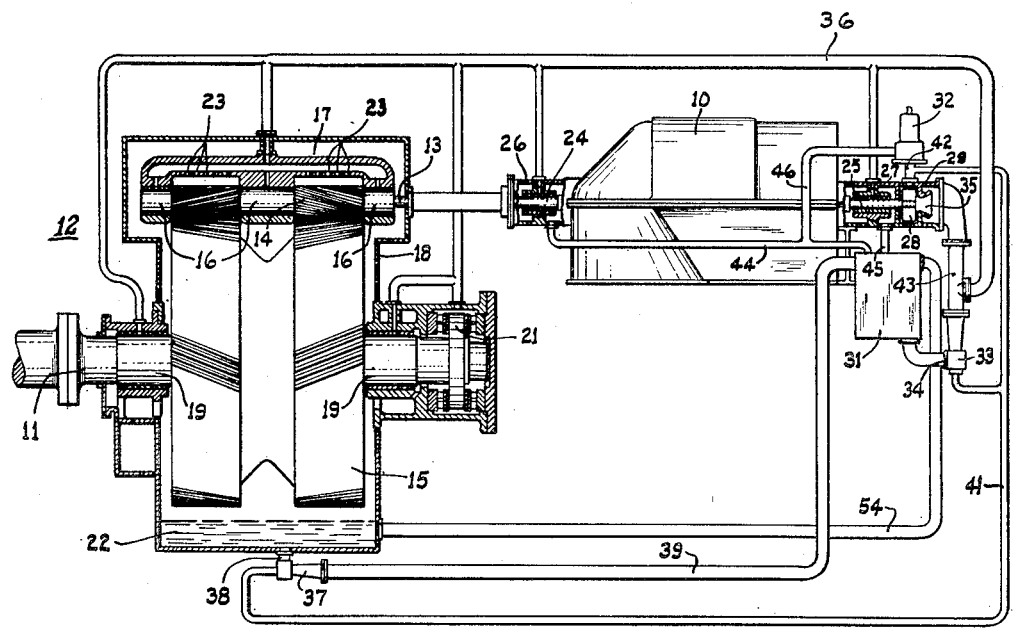
Fig. 1.
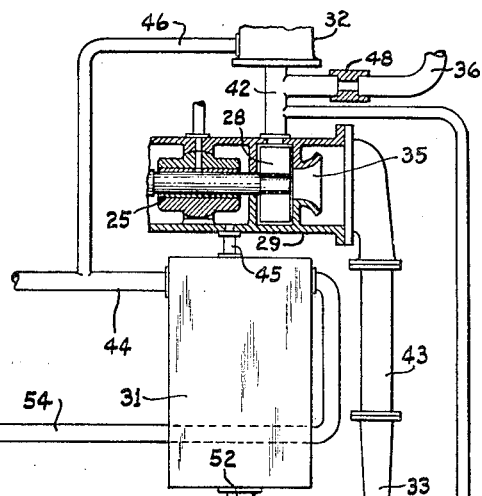
Fig. 2.
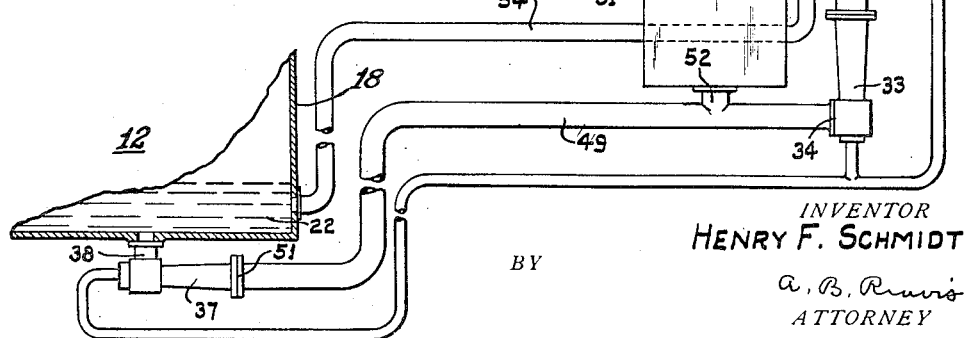
INVENTOR
HENRY F. SCHMIDT
BY
A. B. Reavis
ATTORNEY Patented Jan. 3, 1933

1,893,040

UNITED STATES PATENT OFFICE

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA

LUBRICATING SYSTEM

Application filed February 3, 1932. Serial No. 590,762.

My invention relates to a lubricating system for geared turbine power plants, such as are used, for example, in marine applications for driving a ship's propeller, and it has for an object to provide an improved lubricating system.

In applications of this character, it is usual practice to provide a pumping means which furnishes lubricant under pressure to the working parts of the turbine and gears, and also to provide for draining the lubricant discharged by such working parts to a sump disposed below the gears. The sump may be a separate structure but usually the gear case functions as a lubricant sump. Lubricant collected in the sump is entrained by the pumping means and forced under pressure to the working parts of the gears and turbine. As the sump is at a low level compared to some of the working parts of the power plant, considerable work must be expended by the pumping means in raising lubricant to such parts.

It is a more particular object of my invention to lessen the amount of work expended by the pumping means.

In practicing my invention, I provide a reservoir disposed at an elevation higher than the sump for collecting lubricant from upper portions of the power plant, thereby reducing the head against which the pumping means must raise this portion of the lubricant.

Lubricant which collects in the sump is entrained by a relatively small pumping means, such as, for example, an ejector, and is transferred to a higher level, preferably to the reservoir. Here it is again entrained, together with the lubricant which has drained to the reservoir from the aforementioned elevated power plant portions, by means of a pump or ejector, and is returned under pressure to the working parts of the power plant. It will be seen that the work expended in raising the lubricant by the second-mentioned or main ejector is reduced, as the head at which the main ejector must operate is reduced by the amount represented by the difference in the lubricant level of the reservoir as compared to the lubricant level in the sump.

These and other objects are effected by my invention as will be apparent from the following description and claims taken in connection with the accompanying drawing forming a part of this application, in which:

Fig. 1 is a diagrammatic view of a turbine and reduction gear utilizing my improved lubricating system; and, Fig. 2 is a diagrammatic view of a portion of the system, showing a modified piping arrangement.

Referring now to Fig. 1 of the drawing, I have shown power plant apparatus, comprising a steam turbine 10 driving a slow-speed shaft 11 through reduction gearing indicated generally by the reference numeral 12. The reduction gearing 12 includes a pinion 14 connected to the turbine shaft 13 and meshing with a gear 15 fixed to the shaft 11.

The pinion 14 is journalled in bearings 16 preferably carried by a floating frame structure 17, which structure is supported by the gear case 18. The gear case 18 is formed to provide housings for bearings 19 in which the shaft 11 is journalled, and also to provide a support for a thrust bearing 21. The gear case 18 has a sump 22 formed at the bottom thereof which collects lubricant thrown off by the gear 15 and the pinion 14 and also that which is discharged by the bearings 16, 19 and 21. A series of jets 23 is disposed adjacent the meshing teeth of the pinion 14 and gear 15 to provide a constant spray of lubricant thereon.

The turbine shaft 13 is journalled in bearings 24 and 25, which are enclosed by housings 26 and 27, respectively, and carries at one end thereof an impeller 28, which is the rotating element of a pump 29. A reservoir 31 is disposed adjacent the turbine 10 and is elevated with respect to the sump 22. It is arranged to receive lubricant discharged by upper portions of the apparatus, for example, the turbine bearings 24 and 25.

I have shown a fluid pressure governor 32 in connection with the turbine 10, which governor is controlled by the pressure developed by the impeller 28 and which is arranged to discharge into the reservoir 31 any leakage which may occur therein.

An ejector 33 has its inlet 34 in communication with the reservoir 31 and arranged so that lubricant flows thereto by gravity from the reservoir 31. The ejector 33 discharges lubricant under a suitable pressure through a conduit 43 to the inlet 35 of the pump 29 and to a conduit 36, which communicates with the turbine bearings 24 and 25, the gear bearings 16, 19, and 21 and the series of jets 23. A transfer ejector 37 having its inlet 38 arranged to receive lubricant by gravity from the sump 22, raises the level of the lubricant sufficiently for entrainment by ejector 33, in this embodiment discharging the same through a conduit 39 into the reservoir 31. Motivating fluid for the ejectors 33 and 37 is obtained from the discharge of the impeller 28 through a conduit 41. A conduit 54 communicates with the reservoir 31 above the level of the lubricant therein and also with the sump 22 to provide for overflow in the event that the level of lubricant in the reservoir 31 exceeds a predetermined level.

Having described the structure of my novel lubricating system the operation of the same will be apparent and is as follows:

Lubricant under relatively high pressure is developed by the impeller 28 and is conveyed to the governor 32 by conduit 42 where it is utilized for governing in a well known manner. Motivating fluid under pressure for the ejectors 33 and 37 is discharged by the impeller 28 and conveyed through conduits 42 and 41. The ejector 33 entrains lubricant from the reservoir 31 and discharges the same at a relatively low pressure, for example 5 to 7 pounds per square inch, to the inlet 35 of the impeller pump 29 through the conduit 43. The conduit 36 conveys lubricant from the conduit 43 to the bearings 24 and 25 of the turbine 10 and to the bearings 16, 19 and 21 and the jets 23 of the gear structure. Lubricant draining from the turbine bearings 24 and 25 returns to the reservoir 31 through conduits 44 and 45, while the leakage from the governor 32 drains through the conduit 46 and returns to the reservoir 31 through the conduit 44.

Lubricant draining from the gear and pinion bearings 19 and 16 and from the thrust bearing 21, together with lubricant thrown off by the gear 15 and the pinion 14, drops to the sump 22 and is entrained by the ejector 37 and carried to the reservoir 31 through conduit 39.

A second embodiment of my invention is shown in Fig. 2, in which a modified piping arrangement is utilized. As in the prior embodiment, lubricant drainage from the turbine bearings 24 and the governor 32 is returned to the reservoir 31 through conduits 44 and 46, and the drainage from the bearing 25 returns to the reservoir 31 through the conduit 45. Also the lubricant discharged by the working portions of the reduction gearing 12 is collected in the sump 22 as in the prior embodiment. However, in the present embodiment, the conduit 36 for supplying lubricant under suitable lubricating pressure to the turbine 10 and the reduction gearing 12 receives lubricant from the discharge of the impeller 28 through the conduit 42 and a restricted orifice 48. The orifice 48 is utilized to reduce to a suitable lubricating pressure the relatively high pressure lubricant discharged by the impeller 28 for governing purposes.

Furthermore, in the present embodiment I have shown a conduit 49, which connects the discharge opening 51 of the ejector 37 directly to the inlet 34 of the ejector 33. A conduit 52 communicates with the reservoir 31 and with the conduit 49 intermediate the ejectors 33 and 37. Lubricant entrained from the sump 22 by the ejector 37 is conveyed to a higher level through the conduit 49. Lubricant collected in the reservoir 31 flows by gravity therefrom through conduit 52 to the conduit 49, where it intermingles with that discharged by the ejector 37. As the conduit 49 communicates with the inlet 34 of the ejector 33, lubricant conveyed by the conduit 49 is again entrained and forced under relatively low pressure to the inlet 35 of the pump 29. From there lubricant is conveyed to the parts of the turbine 10 and the reduction gearing 12 in the manner described above.

From the foregoing, it will be seen that the work of circulating lubricant in my improved system is reduced by providing the reservoir 31 and elevating the same with respect to the sump, in that the substantial portion of lubricant draining to the upper reservoir 31 is circulated in the most efficient manner against a reduced head.

In the operation of both of the embodiments described above, the ejector 37 circulates only that portion of lubricant which is collected at a lower level in the sump 22, and applies ahead to said lubricant for raising the same to be entrained by the main ejector 33. The main ejector 33 circulates all of the lubricant, but is only required to raise the same a relatively small height and to apply a relatively small pressure thereto to convey the same to the pump 29 and to the bearings.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The combination with power plant apparatus including a pair of meshing gears and a prime mover for driving the same, of a lubricating system for the power plant apparatus including means for supplying lubricant under pressure thereto, a sump arranged below the gears for collecting lubricant discharged thereby, circulating means for supplying lubricant to said supply means including a reservoir disposed at an elevation higher than the sump and adapted to receive lubricant discharged by portions of the power plant apparatus which are elevated with respect to the reservoir, and means for conveying lubricant from the sump to the circulating means.

2. The combination with a pair of meshing gears and a prime mover for driving the gears, of a lubricating system for the prime mover and gears including means for supplying lubricant under pressure thereto, a sump arranged below the gears for collecting lubricant discharged thereby, circulating means for supplying lubricant to said supply means including a reservoir disposed at an elevation higher than said sump and adapted to receive lubricant discharged by the prime mover and means for conveying lubricant from the sump to the circulating means.

3. The combination with power plant apparatus including a pair of meshing gears and a prime mover for driving the gears, of a lubricating system for the power plant apparatus comprising a main ejector for supplying lubricant under pressure to the prime mover and the gears, a sump arranged below the gears and adapted to collect lubricant discharged thereby, circulating means for supplying lubricant to the inlet of said main ejector including a reservoir disposed at an elevation higher than said sump and arranged to collect lubricant discharged by the prime mover, a transfer ejector for conveying lubricant from the sump to the circulating means, and means for supplying motivating fluid under pressure to the ejectors.

4. The combination with a pair of meshing gears and a turbine having a driving shaft connected to one of the gears, of a lubricating system for the turbine and gears comprising a sump arranged below the gears for collecting lubricant discharged thereby, a reservoir disposed at an elevation higher than the sump and adapted to receive lubricant discharged by the turbine, a main ejector disposed to entrain lubricant from said reservoir and convey the same under pressure to the turbine and gears, a transfer ejector for conveying lubricant from the sump to the reservoir, and an impeller fixed to the turbine shaft for supplying motivating fluid to said ejectors.

5. The combination with power plant apparatus including a pair of meshing gears and a prime mover for driving the gears, of a lubricating system for the prime mover and the gears comprising means for supplying lubricant under pressure thereto, a sump arranged below the gears for collecting lubricant discharged therefrom, a reservoir disposed at an elevation higher than said sump and adapted to receive lubricant discharged by upper portions of the power plant, an ejector for conveying lubricant from the reservoir to said supply means, a second ejector for conveying lubricant from the sump to the reservoir, and means for motivating the ejectors.

6. The combination with a pair of meshing gears and a prime mover for driving the gears, of a lubricating system for the prime mover and gears comprising means for supplying lubricant under pressure thereto, a sump arranged below the gears to receive lubricant discharged thereby, a reservoir disposed at an elevation higher than the sump and adapted to receive lubricant discharged by the prime mover, an ejector arranged to entrain lubricant from the sump, a second ejector having an inlet communicating with the discharge of the first ejector and with the reservoir, means for conveying lubricant from the second ejector to said supply means, and means for conveying lubricant from said supply means to said ejectors for motivating the same.

7. The combination with power plant apparatus including a pair of meshing gears and a prime mover for driving the same, of a lubricating system for the prime mover and the gears comprising lubricant supply means, said lubricant supply means including an impeller driven by the prime mover and an ejector motivated by fluid pressure developed by the impeller and supplying lubricant to the inlet of the impeller, a reservoir for collecting lubricant from upper portions of the power plant, a sump disposed at a lower level than the reservoir for collecting lubricant from the gears, and a second ejector for raising lubricant from the sump to a higher level, the first-mentioned ejector receiving lubricant collected by the reservoir from upper portions of the power plant and lubricant discharged by said second ejector.

In testimony whereof, I have hereunto subscribed my name this 25th day of January, 1932.

HENRY F. SCHMIDT.